United States Patent [19]

Länge

[11] 3,896,646
[45] July 29, 1975

[54] TESTING PROBE FOR NON-DESTRUCTIVE TESTING OF MATERIAL

[75] Inventor: Hans M. Länge, Reutlingen, Germany

[73] Assignees: Institut Dr. Friedrich Förster, Reutlingen; Th. Kieserling & Albrecht, Solingen, both of Germany

[22] Filed: Feb. 20, 1974

[21] Appl. No.: 444,047

[30] Foreign Application Priority Data
Feb. 21, 1973 Germany............................ 2308446

[52] U.S. Cl. ............................ 72/14; 72/95; 72/99; 324/37
[51] Int. Cl. .......................................... B21b 19/10
[58] Field of Search ............... 72/14, 31, 33, 95, 99; 324/37

[56] References Cited
UNITED STATES PATENTS

| | | | |
|---|---|---|---|
| 1,944,954 | 1/1934 | Sperry | 324/37 |
| 2,418,686 | 4/1947 | Zuschlag | 72/31 |
| 3,028,114 | 4/1962 | Asbeck | 72/14 |
| 3,148,563 | 9/1964 | Harley et al. | 72/14 |
| 3,273,364 | 9/1966 | Pohler et al. | 72/14 |

Primary Examiner—Lowell A. Larson

[57] ABSTRACT

A probe having a pair of coils forming two legs of an electrical balance bridge is retractably brought into contact with the material to be tested in the process of being straightened. The movement of the probe is controlled by the inputs to two sensing elements positioned on either side of the probe.

4 Claims, 5 Drawing Figures

PATENTED JUL 29 1975    3,896,646

SHEET 1

TESTING PROBE FOR NON-DESTRUCTIVE TESTING OF MATERIAL

BACKGROUND OF THE INVENTION

The present invention relates to a nondestructive testing device for use with machines used for straightening longitudinally extended metallic materials.

In metal straightening machines, a plurality of pairs of off-set rotary drums, one concave and one convex, rotate and knead the metal to be straightened repeatedly between the two surfaces of the drums. After the material has been sufficiently twisted, it reaches its elastic point and is guided between a pair of guide rails where it then cools sufficiently to solidify. The rotational movement of the two drums upon the material impart a spiral path to the metal.

During assembly and manufacturing most materials must be tested by an appropriate testing device for compliance with predetermined specifications, such as hardness, alloying, conductivity, defects, such as surface imperfections, internal defects, welding defects, as well as dimensional tolerances or eccentricity. Each of these tests may be performed with the aid of nondestructive testing and measuring methods, including inter alia ultrasonic testing, eddy-current testing, magnetographic inspection or radiographic testing by the use of isotopes.

Each of these non destructive tests normally are performed at a separate testing location where the products, either during manufacture or after their completed manufacture, are transported. Inspection lines are frequently planned in connection with the straightening procedure because certain of the above tests and measuring operations can only be carried out on the straightened material, such as the eccentricity of the material.

The transportation for inspection of an article is undesirable in that any additional handling of the article adds to the increased costs of the article. Also, additional space is required for storing the objects awaiting testing and may even require sophisticated material handling devices for performing the transportation itself.

A further disadvantage of transporting the material to a separate test location is the time involved in making such transfer. When high production speeds exceed the testing capability time, including transportation time required, backlogs of material to be tested develop.

In recognizing the above disadvantages, testing devices were developed which were placed in proximity to the material straightening machines for testing the material at such locations. Such testing devices attempted to eliminate the requirement of transferring the material prior to testing.

However, before being straightened, the material is ordinarily quite bent. This required compensating arrangements to be provided, such as a floating suspension of the probe system or electrically compensating circuitry, to compensate for the bends in the material. This testing was further complicated by the fact that ordinarily in testing straightened material it is preferred that the material move in a spiral path. Equipment for the testing was expensive and not always completely accurate.

In an attempt to eliminate the compensating arrangements required in the testing of bent material, the testing probe was placed following the straightening of the metal at a point past the last pair of straightening rolls. Such devices, although an improvement over the previous testing apparatus which required the expensive compensating elements, still had a number of disadvantages.

These disadvantages included the fact that the material as it leaves the end of the last pair of rolls is not moving at a constant longitudinal nor rotary speed. In fact, the speed at which the material moves begins to decrease as soon as the material has left the last pair of straightening rollers. It is usually indispensable however, at least for evaluation of the testing and measuring results, that the material to be straightened passes the probe at a constant speed. To compensate for this change in rotary and longitudinal speeds, expensive compensating arrangements or material handling elements were required.

Also, as the material passed the last pair of rolls, if the height of the table is at a lower level than that of the straightening rolls, the rear end of the material to be straightened flips up, possibly causing damage to the probe. To protect the probe from such damage, a vertically adjustable guide roll must be provided above the track of the material to be straightened to maintain the levels equal to one another.

A further disadvantage of the type of testing devices located at the exit of the straightening process is a result of the vibration of the material as it exits from the straightening machine. This vibration may be the result of the eccentricity in the material itself or due to the vibration of the machine. Such vibration causes inefficiencies in the testing and possible damage to the probe.

It is an object of the present invention to provide an improved testing probe which does not require compensation for variations in the rotary and longitudinal speed of the material after it has been straightened.

A further object of the present invention is to provide an improved testing probe in which the material to be tested is moving at a constant spiral movement during the testing operation.

Another object of the present invention is to provide a testing device which does not require expensive components for maintaining the material to be tested in a perfect alignment as it exits from the testing machinery so as to prevent vibrations.

Still another object of the present invention is to provide a testing device which is less likely to be damaged from the material as it is tested.

Yet an additional object of the present invention is to provide a testing device which has means for indicating the position of the material as it moves past the device, so as to prevent damage to the probe.

Other and further objects and advantages of the instant invention will become apparent from reference being made to the accompanying drawings and the detailed description of the preferred embodiment.

SUMMARY OF THE INVENTION

In the present invention a testing probe, comprising a pair of electric coils mounted on an E-shaped core of ferro-magnetic material is mounted in a plane perpendicular to the direction of movement of the material to be tested and preferably extends through the intersection formed by the two axes of an off-set pair of rolls.

The two electric coils when activated induce an eddy current in the surface of the material to be tested, which, in turn, produces a contervailing magnetic field which react upon the primary magnetic field as well as upon the coil current. The two electric coils form two of the legs of a null bridge and when the countervailing magnetic forces induced by each of the coils in the material to be tested are equal, a "no defect" signal is transmitted. However, when there is a defect in the material to be tested, causing a non-uniform eddy current to be produced, a non-balanced bridge output is generated. The output signal is amplified and rectified for display on an oscilloscope or by other appropriate recordation means.

The test probe is retractably mounted perpendicular to one guide rail associated with the last pair of rolls and extends through the guide rail to come into contact with the material to be tested. A pair of sensing devices serve to indicate the position of the material to be tested so as to prevent damage to the probe. Only when the material to be tested has passed the head of the probe will the probe be placed in contact with the material by activation of a spring element. Immediately prior to the end of the material to be tested passing the head of the probe, the sensor will indicate its approaching end and the probe will be retracted so as to prevent damage to the probe from any burrs which may be present at the end of the material.

The operation and further details of the present invention will be obtained by referring to the drawings accompanying the application and the detailed description.

Figure 1:
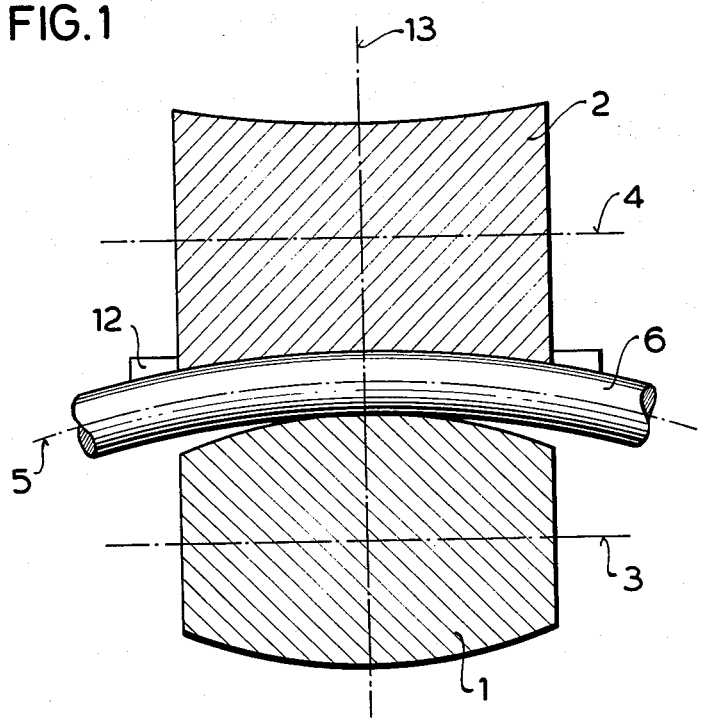
FIG. 1 is a longitudinal sectional side view of a pair of rolls for a straightening machine.
Figure 2:
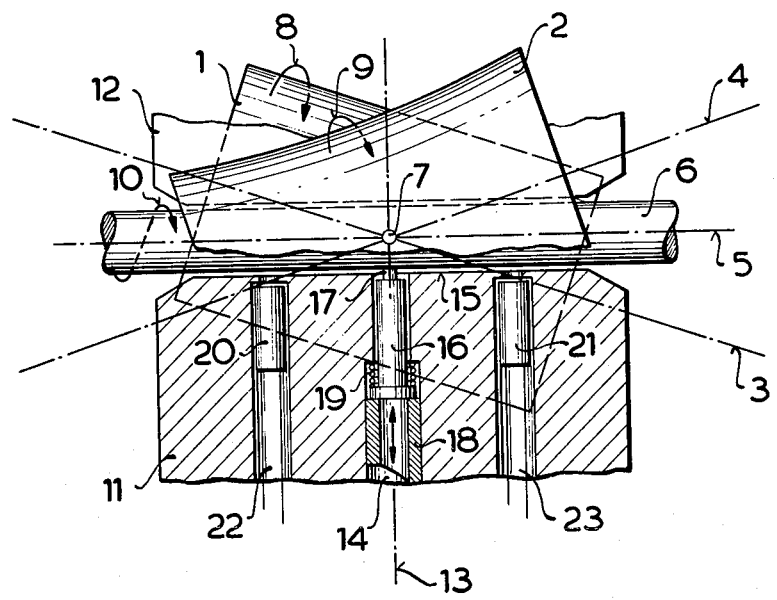
FIG. 2 is a top view of the pair of rolls, shown in FIG. 1, with the test probe shown imbedded in a guide rail.

Referring to FIG. 2 a side sectional view of the two rolls 1 and 2 are shown in the process of kneading the material to be straightened 6. Roller 1 is cylindrical in shape while roller 2 has a slightly concave shape. The axis 3 of roll 1 forms an acute angle with the axis 4 of the concave roll 2, as may be more readily seen from FIG. 2.

Each of the axes 3 and 4 of rolls 1 and 2 also form an acute angle with the central axis 5 of the material 6 to be straightened, which is shown as having a circular cross section. The projections of the axis 3 and 4 into the plane of FIG. 2 form an intersection with the projection of the axis 5 at the center point 7.

The rolls 1 and 2 are rotated by the conventional drive motors, not shown, of the straightening machine in the direction shown by arrows 8 and 9 in FIG. 2. Depending on the precise position of the two rolls 1 and 2, and particularly the distance between them, and the size of the material to be straightened, the material 6 to be straightened is kneaded between the two rolls 1 and 2 to a greater or lesser extent. The movement of the diagonally disposed rolls 1 and 2 simultaneously impart to the material 6 a spiral motion as indicated by the arrow 10 in FIG. 2.

During the straightening operation the material 6 to be straightened is stressed beyond its elastic limit and into the plastic range, due to the simultaneously repeated bending and rotating of the material by rolls 1 and 2. During such bending and rotating, the material 6 to be straightened is guided by the two guide rails 11 (shown in section in FIG. 2) and 12.

The greatest plastic stress on the material 6 to be straightened occurs along the central portion of material 6 such as where the vertical plane 13 of guide rail 11 intersects the central point 7. At the same time, the intersection of plane 13 with material 6 to be straightened where a tangent is drawn to the curvature of material 6 is parallel to the general direction of said material is also the point where the material to be straightened has the smallest lateral motion.

In the vertical plane 13, which in the present example coincides with the center of guide rail 11, the guide rail is provided with a hole 14 for receiving the probe. The hole 14 extends up to and penetrates the forward edge 15 of the guide rail 11, located opposite material 6 to be straightened. Placing the probe 17 at this location provides an optimum location with respect to the surface of the material 6 to be straightened. In hole 14, a probe holder 16 is slidably mounted for permitting engagement of the probe 17 with the surface of material 6 to be straightened, which in the present example is to be non-destructably tested for defects by the use of eddy currents, is slidably mounted.

Figure 4:
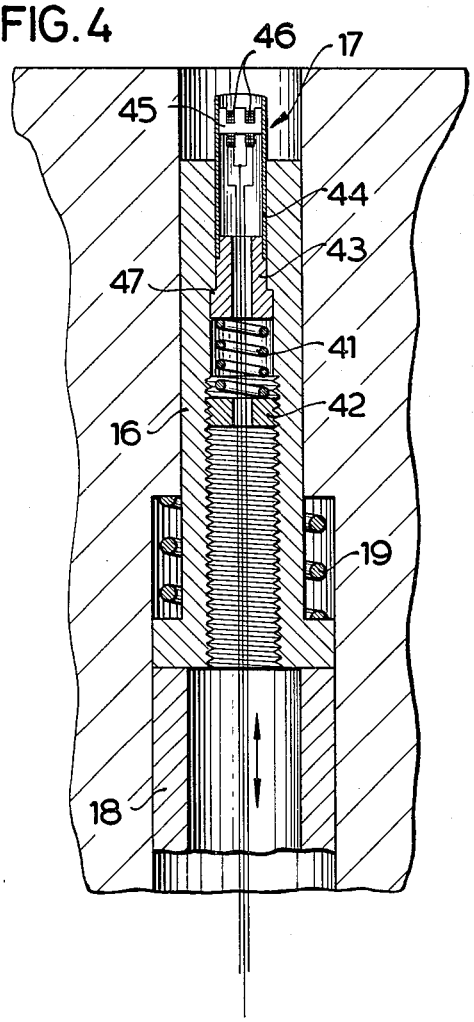
FIG. 4 is an expanded view of the test probe.
Figure 3:
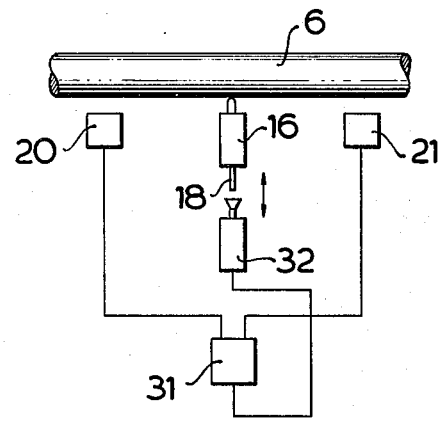
FIG. 3 is a block diagram of a control system for positioning the probe.

Referring to FIG. 3 and FIG. 4 where the probe 17 and mounting arrangement is shown in greater detail, a plunger 18 is shown in the forward of two possible positions, thus urging the probe holder 16 and the probe 17 into the testing position in which the top of the probe 16 is in slidable engagement with the surface of material 6 to be straightened. A spring 19 which is compressed in the working position is relieved when the plunger 18 is retracted to its rearward position, thus retracting the probe holder 16 and probe 17 from the material 6 to be tested and to a position behind the forward edge 15 of the guide reel 11.

Having the tip 16 of the probe being retractable behind the forward edge of the guide rail permits effective protection of the probe 17 from damage occurring from the leading end of the material 6 to be straightened, inasmuch as the probe holder 16 is not moved into the working position until the leading edge of the material 6 to be straightened has moved past the hole 14. Similarly, damage to the tip 16 of the probe is prevented from the rear edge of the material to tested, inasmuch as the probe is retracted before the trailing end of the material to be straightened reaches the hole 14.

The positioning of the plunger 18 in response to the movement of the material 6 to be tested past hole 14 is achieved by the use of two position sensors 20 and 21, shown in FIG. 3, which are installed on either side of hole 14 in appropriate holes 22 and 23 in the guide reel 11, shown in FIG. 2. Each sensor provides an electrical signal when the material 6 to be straightened is immediately above said sensor. The sensor may consist of contact switches, photoelectric sensors, or any other sensory device. The signal from both sensors 20 and 21 is fed to the input of an AND gate 31, shown in FIG. 3. As long as the signals from sensors 20 and 21 indicate that material is present at these locations, the input condition of AND gate 31 will be met and a voltage signal will be sent to solenoid 32, causing the plunger 18 not to retract the probe. If either sensor 20 or 21 indicates the absence of the material to be tested, the signal from the AND gate 31 will cause solenoid 32 to retract plunger 18.

Since the position sensors 20 and 21 are disposed in the immediate vicinity of probe 17, very little time elapses before the leading or trailing edge of the material 6 to be straightened passes both sensors 20 and 21, and the positioning of the probe is such that only very short portions of the leading and trailing ends of the material 6 remain untested. The position sensors 20 and 21 may be replaced by the control elements ordinarily required in a material straightening machine.

Referring to FIG. 4, an enlarged sectional view of the probe assembly is shown in the retracted position.

The probe assembly contains in its interior the probe 17, a spring 41 and a threaded ring 42. The probe 17 is installed in the hole of the probe holder 16 with an easily sliding fit and, in the testing position of the probe holder, pressed lightly against the surface of the material 6 to be straightened by the spring 41 which bears against the threaded ring 42 toward the rear.

In detail, the probe 17 comprises the carrier sleeve 43, the protective tube 44 of ceramic material, the E-shaped core 45 of ferromagnetic material and the two coils 46 wound onto the probe core. The carrier sleeve 43 is provided with a collar 47 which, in the retracted position of the probe holder, moves against a shoulder in the hole of the probe holder 16 acting as a stop to prevent the probe from dropping out of its holder. The protective tube 44 and the carrier sleeve 43 are firmly bonded to each other. The front end of the protective tube 44 serves as a wear-resistant sliding surface for engagement with the surface of the material 6 to be straightened.

Figure 5:
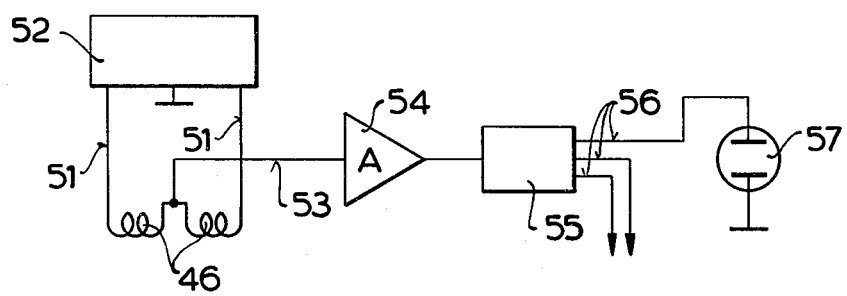
FIG. 5 is a block diagram of the circuitry of the testing device.

In the front part of the protective tube, the probe core 45 is so bonded in position that its pole faces are directly toward the material 6 to be straightened and tested. As will be seen in FIG. 5, the two coils 46 are connected in series, and their free terminals 51 are fed with the symmetrical output of an alternator 52 so that a balance bridge circuit is obtained whose output 53 is connected to the input of the following amplifier 54.

The alternating currents in the two coils 46 produce corresponding alternating magnetic fields in the core of the probe whose lines of force emerge through the pole faces and close over the surface of the material 6 to be straightened, thereby inducing electric eddy-currents in the surface of said material which, in turn, produce magnetic fields and thus react upon the primary magnetic fields as well as upon the coil currents. As long as the pole faces of the probe core 45 are facing homogeneous surfaces, the reactions upon the two coils 45 cancel defects, such as cracks, nicks and the like, an electric signal appears at the output 53 of the bridge circuit which is demodulated in the amplifier 54 and the following rectifier circuit 55. The outputs 56 of said rectifier circuit are applied to an indicator device, such as the picture tube 57, or other evaluation units, such as recording, marking or sorting devices.

What I claim is:

1. In a material straightening machine having a pair of rolls for forming the material and moving it along a definite path:
   a guide rail located at one side of the material as it moves along the path;
   first and second material position sensors carried by said guide rail and spaced from one another along the path, said sensors each providing respective electric signals when the material is located immediately opposite thereto;
   circuit means responsive to the lack of one or both electric signals from said first and second material position sensors for providing a further electric signal;
   a material defect detecting probe carried by said guide rail between said first and second sensors; and
   means responsive to the circuit means further signal for moving said probe in a direction away from the material.

2. In a material straightening machine as in claim 1, in which a spring interrelates the probe and guide rail, and said spring is biased to move the probe toward the material at times other than when the circuit means provides a further signal.

3. In a material straightening machine as in claim 2, in which said probe is mounted within an opening in said guide rail, retracted fully within said opening by said means responsive to said circuit means further signal, and urged by said spring outwardly of said opening during the absence of said further signal.

4. In a material straightening machine having a pair of rolls with diagonally offset axes of rotation for engaging and forming the material:
   a guide rail located at one side of the material directly opposite said rolls;
   first and second material position sensors carried by said guide rail in spaced apart relation, said sensors each providing respective electric signals when the material is located immediately opposite thereto;
   circuit means responsive to the lack of at least one of said electric signals from said first and second material position sensors for providing a further electric signal;
   a material defect detecting probe mounted within an opening in said guide rail between said first and second sensors;
   means responsive to the circuit means further signal for moving said probe in a direction away from the material and completely within the guide rail opening; and
   a coil spring interrelating the probe and guide rail, said spring being biased to move the probe toward the material at times other than when the circuit means provides said further signal.

* * * * *